May 9, 1950  J. PHILLIPS ET AL  2,507,420
STOP SIGNAL APPARATUS
Filed July 10, 1947
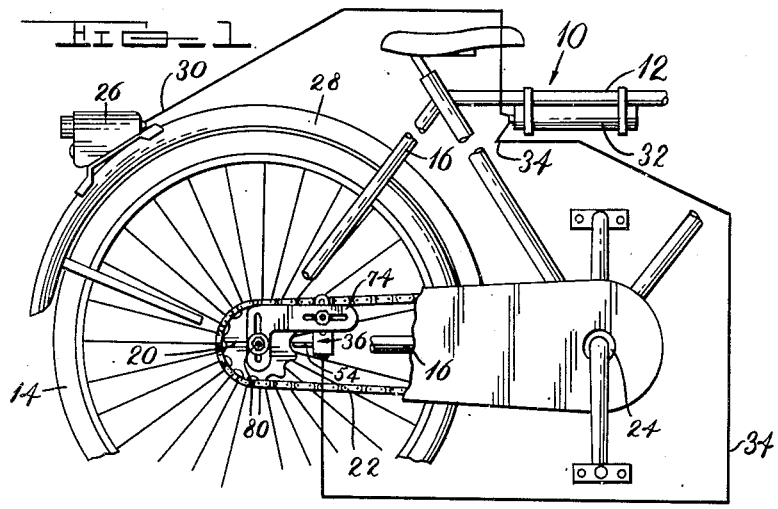
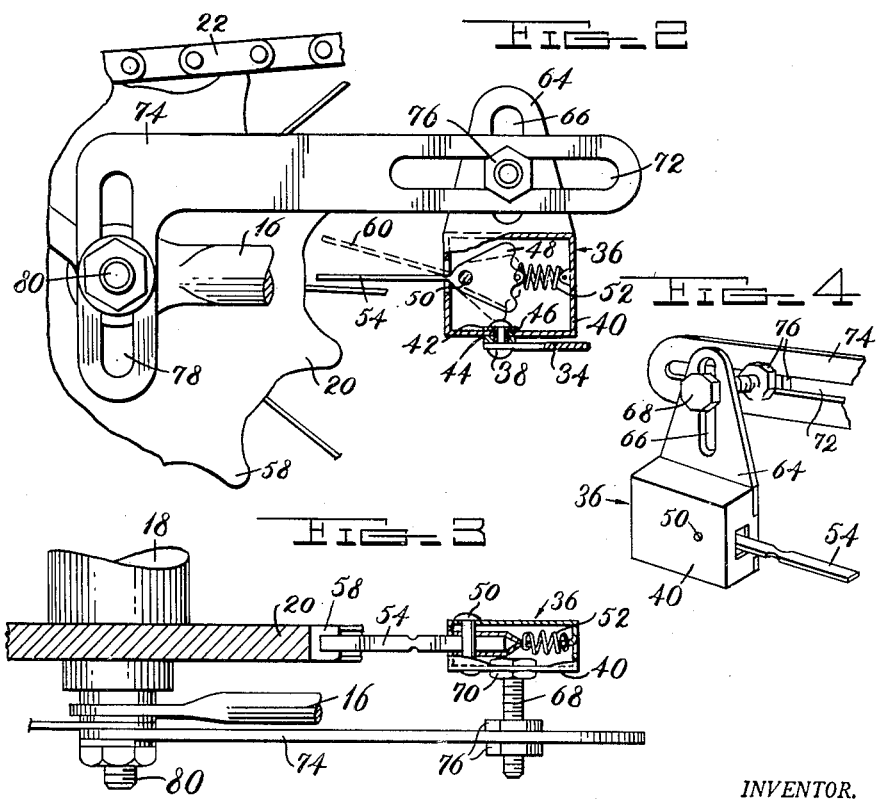
INVENTOR.
JOHN PHILLIPS
FRANCIS SULLIVAN
BY
Barnes, Kisselle, Laughlin & Raisch
ATTORNEYS Patented May 9, 1950

2,507,420

UNITED STATES PATENT OFFICE 2,507,420

STOP SIGNAL APPARATUS

John Phillips and Francis Sullivan, Detroit, Mich.; said Sullivan assignor to said Phillips Application July 10, 1947, Serial No. 759,978

4 Claims. (Cl. 200—52)

This invention relates to stop signal apparatus and more particularly to a stop signal device adapted for use on a bicycle.

The principal object of the invention is to provide a switch for operating the tail light of a bicycle which automatically indicates when the cyclist intends to stop.

It is a further object of the invention to provide a switch for operating the tail light of a bicycle which is positively actuated by one of the sprockets of a bicycle to turn the tail light both on and off.

A still further object of the invention is to provide a simply constructed and inexpensive switch for a bicycle stop signal which may be easily applied to a bicycle by an unskilled person, the switch having adjustable mounting members which enables the use of the same switch on bicycles having different size driven sprockets.

A stop signal switch embodying the present invention is shown in the following drawings in which:

Figure 1 is a partial side elevation of a bicycle equipped with a stop signal switch of my invention, some parts of the bicycle being broken away.

Figure 2 is an enlarged view of the switch, partly in section, illustrating the manner in which it is positioned with respect to the sprocket on the rear wheel of the bicycle.

Figure 3 is a top view partly in section of the switch arrangement shown in Figure 2.

Figure 4 is a perspective view of the switch and a portion of the bracket employed for mounting the switch on a bicycle.

With reference to the drawings, there is shown in Figure 1 a bicycle 10 having a frame 12 and a rear wheel 14 supported between rear fork frame members 16. Wheel 14 is provided with a coaster brake 18 of ordinary construction and is driven by a sprocket 20 through a chain 22 from a pedal sprocket 24 on the frame of the bicycle. It will be understood, of course, that the bicycle is propelled forwardly when sprocket 20 is driven in a clockwise direction, as viewed in Figures 1 and 2, and that brakes 18 are applied to stop the bicycle when sprocket 20 is actuated in the opposite direction.

A stop light 26 is conveniently mounted on the rear fender 28 of the bicycle and is connected by means of a conductor 30 with a battery 32. The other side of light 26 is grounded by suitable means (not shown) to frame 12 of the bicycle. A second conductor 34 extends from battery 32 to switch 36. At the switch end, conductor 34 is connected to a contact pin 38 which extends through the lower wall of the switch housing 40 and serves as the fixed contact of the switch. Contact 38 is insulated from switch housing 40 by means of fiber washers 42, 44 and 46.

Within housing 40 a moveable contact 48 is mounted on a pin 50 so as to pivot in a vertical plane into and out of contact with contact pin 38. Contact 48 is urged to both the make and break positions by an over center compression spring 52 acting between the forward end of contact 48 and the front wall of housing 40. In the open position contact 48 abuts against the top wall of housing 40. The rear portion of switch contact 48 is formed into a spring arm 54 which projects rearwardly through an opening 56 in housing 40. Arm 54 is vertically aligned in the plane of sprocket 20 and is positioned so as to be wiped upwardly or downwardly by the teeth 58 of sprocket 20 whenever the sprocket is rotated in either direction. That is to say, in either of its pivoted positions, arm 54 is engaged by the tooth portions 58 of sprocket 20. If the arm is in the raised position, indicated by the broken line 60 in Figure 2, and sprocket 20 is driven in a counterclockwise direction, the arm is flexed upwardly as it rides over the teeth 58, and likewise, if arm 54 is in the raised position and sprocket 20 is driven in a clockwise direction, the arm is snapped downwardly by teeth 58 and in this lowered position flexes downwardly as it rides over each of the teeth 58. To lend greater flexibility to the outer end of arm 54, the arm may be notched as at 62 to reduce its cross section at this point.

It will, of course, be appreciated that switch arm 54 will be actuated in both directions by teeth 58 in the manner just described only if the switch is positioned properly with respect to rear sprocket 20 and since different bicycles very often employ different size sprockets, adjustable mounting means for the switch must be provided to enable its use on any bicycle. Accordingly, switch housing 40 is provided with a suspension bracket 64, preferably integral with one of the side walls of the housing, having a vertically elongated slot 66 in which a threaded bolt 68 is adapted to be adjustably clamped at its head end by means of a nut 70. The other end of bolt 68 is arranged to pass through a horizontal slot 72 in one leg of an L-shaped bracket 74 and adjustably clamped therein by means of nuts 76. Bracket 74 is also provided with a vertical slot 78 which enables the bracket to be adjustably mounted on the axle 80 of wheel 14. The use of an L-shaped bracket in this manner permits vertical and longitudinal adjustment of the switch with respect to sprocket 20 and the switch may also be aligned in the vertical plane of sprocket 20 by means of adjustment nuts 70.

Assuming that switch 36 is positioned properly with respect to sprocket 20, spring arm 54 is snapped upwardly when the brakes are applied causing contact 48 to swing downwardly into contact with contact pin 38. Since contact 48 is grounded to the bicycle frame through the housing 40 and bracket 74, a circuit from the battery through the switch and to the stop signal 26 is completed which automatically illuminates the light, thereby indicating that the cyclist intends to stop. It will be observed that by reason of spring 52, contact 48 will remain in contact with pin 38 until the cyclist pedals forwardly and causes the teeth 58 to snap arm 54 downwardly. Arm 54 is positively actuated in both directions and will remain in either of its biased positions until the direction of rotation of sprocket 20 is actually reversed.

It will thus be seen that the present invention provides a very compact and inexpensive switch for operating a bicycle stop signal. The switch mechanism is substantially completely enclosed within the housing 40 and does not employ any closely fitting parts the operation of which would be affected by particles of dirt and foreign matter to which switches for the purpose are invariably exposed.

We claim:

1. A switch for operating a stop signal on a bicycle having a toothed sprocket adapted to be rotated in one direction for propelling the bicycle and in the other direction for braking the bicycle comprising a support member adapted to be mounted on the bicycle adjacent said sprocket, a fixed contact member insulatively supported by said support member, a pivoted contact member pivoted on said support member and arranged to contact said fixed contact when pivoted in one direction to close the switch and abut against a stop surface on said support to limit the pivotal movement of said pivoted contact in the other direction when said switch is open, means for pivoting said pivoted contact into and out of contact with said fixed contact comprising a resilient arm on said pivoted contact member arranged to project into the path of travel of the tooth portions of said sprocket and be engaged by said tooth portions so as to pivot said pivoted contact to the open position when said bicycle is propelled and to the closed position when braking is applied, and over center resilient means for biasing said pivoted contact member toward closed or open position, said fixed contact and stop surface being spaced apart such that the arc of travel of said pivoted contact from center to one of its extreme positions is less than the arcuate distance between successive teeth on said sprocket.

2. A switch for operating a stop signal on a bicycle having a toothed sprocket adapted to be rotated in one direction for propelling the bicycle and in the other direction for braking the bicycle comprising a support member, a fixed contact member insulatively supported by said support member, a pivoted contact member pivoted on said support member and arranged to contact said fixed contact when pivoted in one direction to close the switch and to abut against a stop surface on said support to limit the pivotal movement of said pivoted contact in the other direction when said switch is open, over center resilient means acting between said pivoted contact member and said support for biasing said pivoted contact toward open or closed position, a resilient arm carried by said pivoted contact member, and means for adjustably mounting said support on the bicycle so that said resilient arm projects into the path of travel of the tooth portions of said sprocket and is engaged and pivoted by the tooth portions of said sprocket and pivoted so as to open said contacts when the bicycle is propelled and to close said contacts when braking is applied, said fixed contact and stop surface being positioned such that the angle included between center and one extreme position of said arm is less than the angle included between successive teeth on said sprocket.

3. A switch for operating a stop signal on a bicycle having a toothed sprocket adapted to be rotated in one direction for propelling the bicycle and in the other direction for braking the bicycle comprising a housing, a fixed contact member within said housing and insulated therefrom, a pivoted contact member pivoted within said housing and arranged to contact said fixed contact to close said switch when pivoted in one direction, said housing having a stop surface on the inside thereof for limiting the pivotal movement of said pivoted contact member in the opposite direction to open said switch, over center resilient means biasing said pivoted contact member toward open or closed position, an arm fixed to said pivoted contact member and extending through a wall of said housing, and means for positioning said housing on the bicycle so that the outer end of said arm projects into the path of travel of the tooth portions of said sprocket and is snapped by said tooth portions over center in one direction to open said contacts when the bicycle is propelled and snapped in the other direction to close said contacts when braking is applied by reversing the rotation of said sprocket, said fixed contact and stop surface being positioned such that the extent of travel of the end of said arm from center to either of its extreme positions is less than the distance between successive teeth on said sprocket.

4. A switch for operating a stop signal on a bicycle having a toothed sprocket adapted to be rotated in one direction for propelling the bicycle and in the other direction for braking the bicycle comprising a switch housing adapted to be mounted on the bicycle adjacent said sprocket, a fixed contact within said housing, a pivoted contact member mounted in said housing for pivotal movement from a closed position in contact with said fixed contact to an open position in contact with a stop surface within said housing, an over center spring acting between said pivoted contact and said housing, said spring in one position biasing said contact to close said switch and in another position biasing said contact to open said switch and means for actuating said pivoted contact to either of said positions with a snap movement comprising an arm on said pivoted contact member extending through a wall of said housing and arranged to project at its end into the path of travel of the tooth portions of said sprocket, said arm in both the open and closed position of said switch being engageable by said tooth portions so that when said sprocket is rotated in the direction for propelling the bicycle said arm is engaged by said tooth portions and snapped to the open position and when the direction of rotation of said sprocket is reversed said arm is snapped by said tooth portions to the closed position, said fixed contact and stop surface being positioned such that the extent of travel of the end of said arm from center to either of said extreme positions is less than the distance between successive teeth on said sprocket.

JOHN PHILLIPS.
FRANCIS SULLIVAN.

REFERENCES CITED

The following references are of record in the file of this patent:

UNITED STATES PATENTS

| Number | Name | Date |
| --- | --- | --- |
| 1,902,700 | Hadano | Mar. 21, 1933 |
| 2,090,805 | Oliver | Aug. 24, 1937 |
| 2,158,369 | Jackson | May 16, 1939 |
| 2,222,075 | Johnston | Nov. 19, 1940 |

FOREIGN PATENTS

| Number | Country | Date |
| --- | --- | --- |
| 388,214 | Great Britain | Feb. 23, 1933 |